United States Patent
Simpson et al.

(10) Patent No.: US 8,301,452 B2
(45) Date of Patent: Oct. 30, 2012

(54) VOICE ACTIVATED APPLICATION SERVICE ARCHITECTURE AND DELIVERY

(75) Inventors: Todd Simpson, Saratoga, CA (US); Nathan Chandler, Fayetteville, GA (US); Alan Hawrylyshen, Santa Cruz, CA (US); Chad Madison, Lakewood Village, TX (US); Mike Lambert, San Jose, CA (US); Karl Brown, San Jose, CA (US)

(73) Assignee: Ditech Networks, Inc., San Jose, CA (US)

( * ) Notice: Subject to any disclaimer, the term of this patent is extended or adjusted under 35 U.S.C. 154(b) by 402 days.

(21) Appl. No.: 12/540,258

(22) Filed: Aug. 12, 2009

(65) Prior Publication Data

US 2010/0042413 A1    Feb. 18, 2010

Related U.S. Application Data

(60) Provisional application No. 61/088,266, filed on Aug. 12, 2008, provisional application No. 61/152,219, filed on Feb. 12, 2009.

(51) Int. Cl.
*G10L 21/00* (2006.01)
(52) U.S. Cl. ...................... 704/270; 704/270.1; 704/275
(58) Field of Classification Search .................. 704/270, 704/270.1, 275; 379/67.1–77, 88.01–88.28
See application file for complete search history.

(56) References Cited

U.S. PATENT DOCUMENTS

| | | | |
|---|---|---|---|
| 7,684,815 B2 * | 3/2010 | Counts et al. ................. | 455/518 |
| 2007/0021145 A1 | 1/2007 | Lam | |
| 2007/0121826 A1 * | 5/2007 | Sako et al. ................. | 379/88.21 |
| 2008/0154870 A1 | 6/2008 | Evermann et al. | |
| 2008/0155080 A1 * | 6/2008 | Marlow et al. ................. | 709/223 |
| 2008/0240379 A1 * | 10/2008 | Maislos et al. ............. | 379/88.13 |
| 2008/0240382 A1 * | 10/2008 | Fujita-Yuhas .............. | 379/88.16 |
| 2009/0172108 A1 * | 7/2009 | Singh ............................ | 709/206 |
| 2009/0316863 A1 * | 12/2009 | Fitzsimmons ............. | 379/88.11 |

OTHER PUBLICATIONS

PCT International Search Report and Written Opinion, PCT Application No. PCT/US2009/053615, Oct. 1, 2009, seven pages.

* cited by examiner

*Primary Examiner* — Douglas Godbold
(74) *Attorney, Agent, or Firm* — Fenwick & West LLP (57) ABSTRACT

A system and method for retrieving distributed content responsive to voice data are disclosed. Voice data is transmitted from a source client device to media server which applies a mixing table to route the voice data to one or more destinations described by the mixing table. The media server also analyzes the received voice data for one or more events. Responsive to detecting an event, the media server communicates with an application server, which modifies the mixing table so that subsequent data is also routed to a media generator which analyzes voice data received after detection of the event for a command. The media generator communicates with the application server to retrieve data from a user data source, such as a website, associated with a detected command. The media generator produces an audio representation of the retrieved data which is communicated to the source client device via the media server.

26 Claims, 7 Drawing Sheets

VOICE ACTIVATED APPLICATION SERVICE ARCHITECTURE AND DELIVERY

CROSS REFERENCE TO RELATED APPLICATIONS

This application claims the benefit, under 35 U.S.C. §119(e) of U.S. Provisional Application No. 61/088,266, filed Aug. 12, 2008, and U.S. Provisional Application No. 61/152,219, filed Feb. 12, 2009, which are incorporated by reference in their entirety.

BACKGROUND

1. Field of Art

The present invention generally relates to the field of accessing distributed content or applications, and more specifically, to accessing content or applications in response to voice data.

2. Description of the Related Art

Conventional voice services are synchronous and limited to a single service level. Users determine whether to use a conventional voice service well before beginning to use the voice service. For example, a user decides to access voicemail several seconds before dialing a specific number associated with a voicemail service. Because accessing existing voice services requires a specific user interaction, such as dialing a specific phone number, to be accessed, it is impractical to access these conventional voice services during a telephone call with another party. For example, conventional voicemail services do not allow a party to a phone conversation to access voicemail without first ending the phone conversation and placing a separate phone call to access the voicemail.

Additionally, existing voice services are limited to providing single types of services, requiring multiple different voice service providers to be accessed to receive different types of services. While listening to a voicemail or participating in a conversation, existing voice services cannot be accessed to perform additional actions or retrieve additional information associated with the content of the voicemail or conversation. For example, to return a call to a person who has left a voicemail currently being accessed, interaction with the voicemail is terminated and a separate call is initiated to contact the person who left the voicemail. Similarly, if additional information about a topic arising in a phone conversation is needed, such as directions to a location mentioned in the conversation, the phone conversation is terminated so that one of the parties may place a separate call to a voice service to obtain the desired additional information.

Further, conventional voice services do not access information from distributed data sources, such as online or Internet-based applications or distributed storage locations. These distributed data sources have become increasingly popular and accessible from various mobile devices, such as smart phones, netbook computers or laptop computers, but the content and functionality provided by these distributed data sources has not been integrated into voice based communication, preventing voice communication from incorporating a range of data or services into data communication. For example, existing voice services cannot access online data or online account information not previously associated with an audio presentation gateway. Similarly, users are unable to directly communicate data exchanged between two parties in a voice conversation to a distributed data source without use of a dedicated speech recognition application. Currently, separate interfaces are used for exchange of voice data and access to data maintained by a distributed data source.

SUMMARY

A system accesses data from a remote source, such as a user data store, responsive to voice data. A client device transmits voice data including an event. For example, the client device comprises a telephone establishing a phone call to a second client device to exchange voice data. A media server routes voice data received from the client device to the one or more destinations identified by a mixing table which identifies one or more destinations for the voice data. In one embodiment, an application server receives an initiation request from the client device and generates the mixing table to identify one or more destinations to which voice data is routed. The media server also analyzes voice data for an event, such as a keyword or stress pattern. Responsive to detecting an event, an application is initialized by the application server and subsequently received voice data is also routed to a media generator which analyzes the voice data for a command. In one embodiment, the media server communicates with the application server after an event is detected, and the application server modifies the mixing table to identify the media generator as an additional destination for the voice data. The media generator analyzes voice data from the media server and identifies a command associated with the initialized application within the voice data. Responsive to detecting a command, the media generator communicates with the application server. For example, the media generator transmits a text representation of the command and an identifier associated with the client device to the application server. The application server transmits a request for data to a user data store responsive to the media generator detecting a command. The user data store includes data or services associated with one or more users and transmits the requested data to the application server. In an embodiment, the application server transmits data from the user data store to the media generator, where an audio representation of the data from the user data store is generated and transmitted to the media server for communication to the client device. Alternatively, responsive to the media generator detecting the command, the application server transmits data to the user data store for storage or for manipulating data included in the user data store.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

A system and method for accessing content or applications in response to voice data are disclosed. For purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

System Architecture

Figure 1:
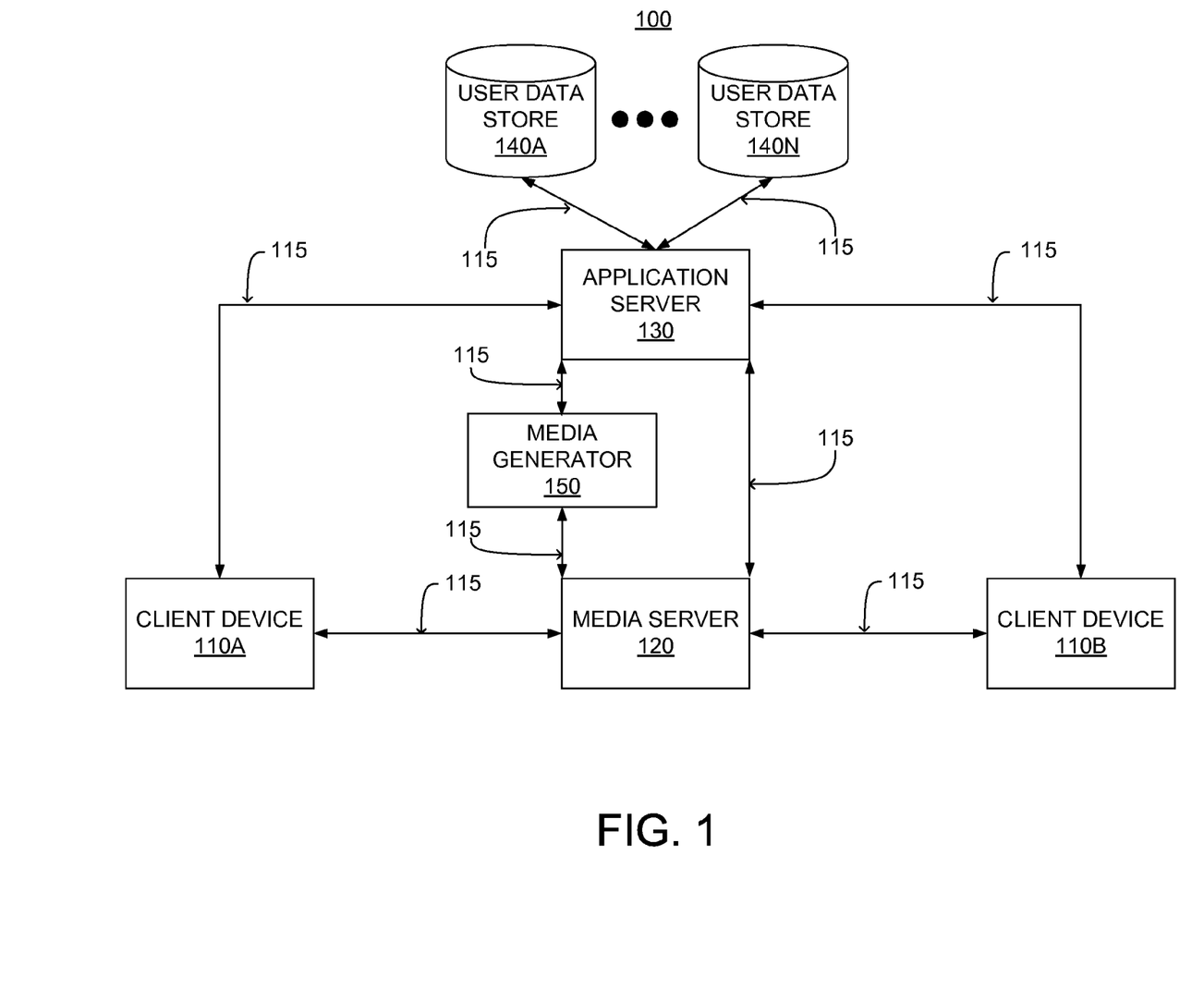
FIG. 1 is a block diagram of a system for voice-initiated access of distributed content according to an embodiment of the present invention.

FIG. 1 is a block diagram of a system 100 for voice-initiated access of distributed content according to an embodiment of the present invention. The system 100 comprises one or more client devices 110A, 110B, a media server 120, an application server 130 and one or more user data stores 140A, 140N and a media generator 150. These components are communicatively coupled by a network 115, shown in FIG. 1 as various connecting lines between these components.

The 110A, 110B are one or more computing devices having data processing and communication capabilities for transmitting data, such as voice data, between each other using the network 115. In one embodiment, client device 110A establishes a unidirectional data stream to transmit data to client device 110B via network 115 and client device 110B establishes a second unidirectional data stream to transmit data to client device 110A via network 115. Alternatively, a bidirectional communication stream is established between the client device 110A and the client device 110B to exchange data, such as voice data, using network 115. For example, client devices 110A, 110B comprise cellular telephones, rotary telephones, desktop computers, laptop computers or any other device which transmits or receives voice data, or other audio data using the network 115.

The media server 120 comprises a computing device, or network of computing devices, receiving voice data, or other data, from a client device 110A, 110B and routing the voice data to one or more destinations. While the application server 130, further described below, generates a mixing table, or mixing matrix, identifying one or more destinations for data received from a client device 110A, 110B, the media server applies the mixing table to voice data from client devices 110A, 110B to transmit the voice data to one or more destinations specified by the mixing table. In an embodiment, the mixing matrix routes data to additional devices, such as the application server 130 and/or the media generator 150 or to components internal to the media server 120, such as those described below in conjunction with FIG. 2.

In addition to applying the mixing table, or mixing matrix, to voice data from one or more client devices 110A, 110B the media server 120 identifies one or more keywords in the received data, and communicates data associated with one or more identified keywords to the application server 130 and/or the media generator 150. Data from the media server 120 allows the application server 130 to modify the mixing table to route received data to destinations associated with the detected keyword, such as the application server 130 or the media generator 150. For example, keywords are words or phrases included in voice data that are associated with an application or associated with data stored by a user data store 140. Detection of a keyword indicates that subsequently received data is analyzed in additional detail to identify data for retrieval or manipulation. In one embodiment, the media server 120 applies one or more speech recognition algorithms and/or one or more enhancement algorithms to the received data to remove impairments and improve the accuracy of keyword detection. The media server 120 is described below in more detail in conjunction with FIG. 2.

The application server 130 comprises a computing device receiving data from one or more client devices 110A, 110B and generates a mixing table, or mixing matrix, identifying one or more destinations to which received data is routed by identifying one or more phone numbers or other identifiers from the received data. For example, responsive to receiving a voice call, the application server 130 identifies a source phone number initiating the voice call and identifies a destination phone number to generate a mixing table describing data communication from the source phone number to the destination phone number, and vice versa. The application server 130 transmits the generated mixing table to the media server 120 via the network 115, allowing the media server 120 to route voice data from a client device 110A, 110B to one or more destinations.

The application server 130 also exchanges data with the media server 120, the user data store 140 and the media generator 150 and/or executes an application responsive to commands identified within the received data by the media generator 150. After the media server 120 identifies a keyword included in the received data, the media server 120 transmits an application request to the application server 130, enabling the application server 130 to identify one or more commands for which received data is analyzed. The application server 130 communicates the one or more commands to the media generator 150, which analyzes subsequently exchanged voice data to identify a command. For example, the media server 120 transmits identifiers associated with the client devices 110A, 110B exchanging data and the event that was detected to the application server 130. This application request enables the application server 130 to identify a client device 110A, 110B that is to receive data from the application server 130, determine one or more commands for identification within the exchanged data and modify the mixing table so voice data is communicated to the media generator 150 for analysis. After transmitting the application request, the application server 130 transmits the modified mixing table to the media server 120 so that data subsequently received by the media server 120 is routed to the media generator 150 which examines the data for one or more commands associated with the application.

Responsive to the media generator 150 detecting a command in the data, the application server 130 receives data from the media generator 150 via network 115 which identifies an application associated with the command or data associated with the command for retrieval from a user data store 140. Data retrieved by the application server 130 is subsequently routed to the media generator 150 where an audio representation of the data is generated and communicated to a client device 110A, 110B, specified by the application request, via the media server 120 and the network 115. For example, voice data is transmitted from a source client device 110A to a destination client device 110B via the media server 120, which also routes the voice data to the media generator 150 after detecting a keyword and transmitting an application request to the application server 130. The voice data is analyzed by the media generator to identify a command included in the voice data. If a command is identified from the voice data, or other data, the application server 130 receives data from the media generator 150 identifying an action associated with the identified command or data to retrieve from a user data store 140. In an embodiment, the application data server 130 also communicates data extracted by the media generator 150 to a user data store 130 for use in an application or for storage.

The application server 130 also establishes and terminates voice calls using a public switched telephone network (PSTN) or using a Voice-Over Internet Protocol (VoIP). The application server 130 receives control data from a client device 110A, 110B when a telephone call, or other data exchange, is initiated and identifies control information, such as a telephone number or other identifier associated with the client devices 110A, 110B exchanging data to establish a communication channel through which the client devices 110A, 110B transmit or receive voice data and/or other data. In an embodiment, the application server 130 uses Signaling System #7 (SS7) or H.323 to exchange control information for establishing communication between client devices 110A, 110B, allowing use of PSTN or VoIP to exchange data. In an alternative embodiment, a discrete component communicating with the application server 130 establishes and/or terminates voice calls. The application server 130 is described below in more detail in conjunction with FIG. 3.

A user data store 140 comprises one or more computing devices or storage devices coupled to the application server 130 by the network 115. In one embodiment, the user data store 140 includes data associated with one or more users and/or applications associated with the one or more users. For example, the user data store 140 includes user-specific data, such as calendar data describing a user's schedule, an address book describing a user's contacts, a message store including a user's voice, email, or other messages. In an embodiment, the user data store 140 also includes one or more applications for accessing or modifying the user-specific data. In another embodiment, the user data store 140 also communicates with one or more distributed applications, such as Web-based applications, allowing the user data store 140 to access additional data associated with a user from other sources. For example, the user data store 140 communicates with a social networking website to retrieve status information associated with a user or status messages received from other members of the social networking website. The user data store 140 also allows user data to be communicated to a distributed application responsive to one or more user commands identified by the application server 130.

The media generator 150 is coupled to the media server 120 and the application server 120 via the network 115 and comprises a computing device which receives voice data from the media server 120 and identifies commands within the voice data. For example, the media generator 150 applies one or more speech recognition methods to voice data to determine whether the voice data includes one or more commands identified by the application server 130. When the media generator 150 identifies a command within voice data, the media generator 150 communicates data describing the identified command to the application server 130. The communicated data allows the application server 130 to perform an action associated with the identified command or retrieve data associated with the identified command. Hence, the media generator extracts commands from voice data and produces data for use by the application server 130 to perform an action associated with the extracted command.

Additionally, the media generator 150 receives data from the application server 130, such as data retrieved from a user data store 140 or the results of an action performed by the application server 130, and generates an audio representation of the received data. The audio representation is communicated from the media generator 150 to the media server 120 for communication to a client device 110A, 110B. By generating an audio representation of data from the application server 130, the media generator 150 allows retrieved data or generated results to be inserted into voice data exchanged between client devices 110A, 110B. The media generator 150 is further described below in conjunction with FIG. 4.

By monitoring data for commands, the media generator 150 allows the application server 130 to initiate an application, retrieve data or modify responsive to content included in a data stream. This increases availability of application data availability by allowing one or more voice enabled devices, such as client devices 110A, 110B, to access one or more applications or data from a user data store 140, such as an Internet-accessible data store, a website including user information or a website providing one or more services. Using the media server 120 in combination with the application server 130 and media generator 150 reduces the cost of accessing applications or data using voice data. The media server 120 initially detects keywords in data from a client device 110A, 110B and the media generator 150 performs a more detailed analysis of voice data received after keyword detection to recognize specific commands. For example, responsive to detecting the word "initiate" in a voice data stream, the media server 120 routes subsequently received voice data through the media generator 150, which identifies one or more specific commands in the voice data associated with an application or associated with data. This simplifies detection by allowing the media server 120 to detect any relevant attribute of the data stream, such as time-domain samples, a frequency domain pattern or a series of parameters or values associated with the data transmission or encoding. When a keyword is detected, the media generator 150 more particularly analyzes subsequently-received data for one or more specific commands to generate data for the application server 130 to perform one or more actions associated with the detected command.

In one embodiment, a network 115 (shown generally as the lines connecting the components of FIG. 1) is used to transmit data or instructions between or among the client devices 110A, 110B, the media server 120, the application server 130, 120B, the user data store 140, the signaling server 150 and/or other devices (not shown). The network 115 may comprise a conventional wireless data communication system, for example, general packet radio service (GPRS), IEEE 802.11 (or WiFi), IEEE 802.16 (or WiMax), Bluetooth, PSTN or any other suitable wireless communication system. Alternatively, the network may comprise a conventional wired data communication system, such as Ethernet, digital subscriber line (DSL), integrated services digital network (ISDN), telephone line or any other suitable wired communication system. In an embodiment, the network comprises a combination of a wireless communication system and a wired communication system. In an embodiment, the network 115 uses a first communication system, such as a PSTN or radio communication network, to exchange voice data, or other audio data, between the client device 110A and the client device 110B and uses a second communication system, such as Ethernet, WiFi or WiMax, to transmit user data or other data between the client device 110 A and the client device 110B.

Although shown in FIG. 1 as discrete components, in various embodiments any or all of the media server 120, the application server 130 and/or the signaling server 150 may be combined, allowing a single component to perform the functions of one or more of the media server 120, the application server 130 and/or the signaling server 150.

Figure 2:
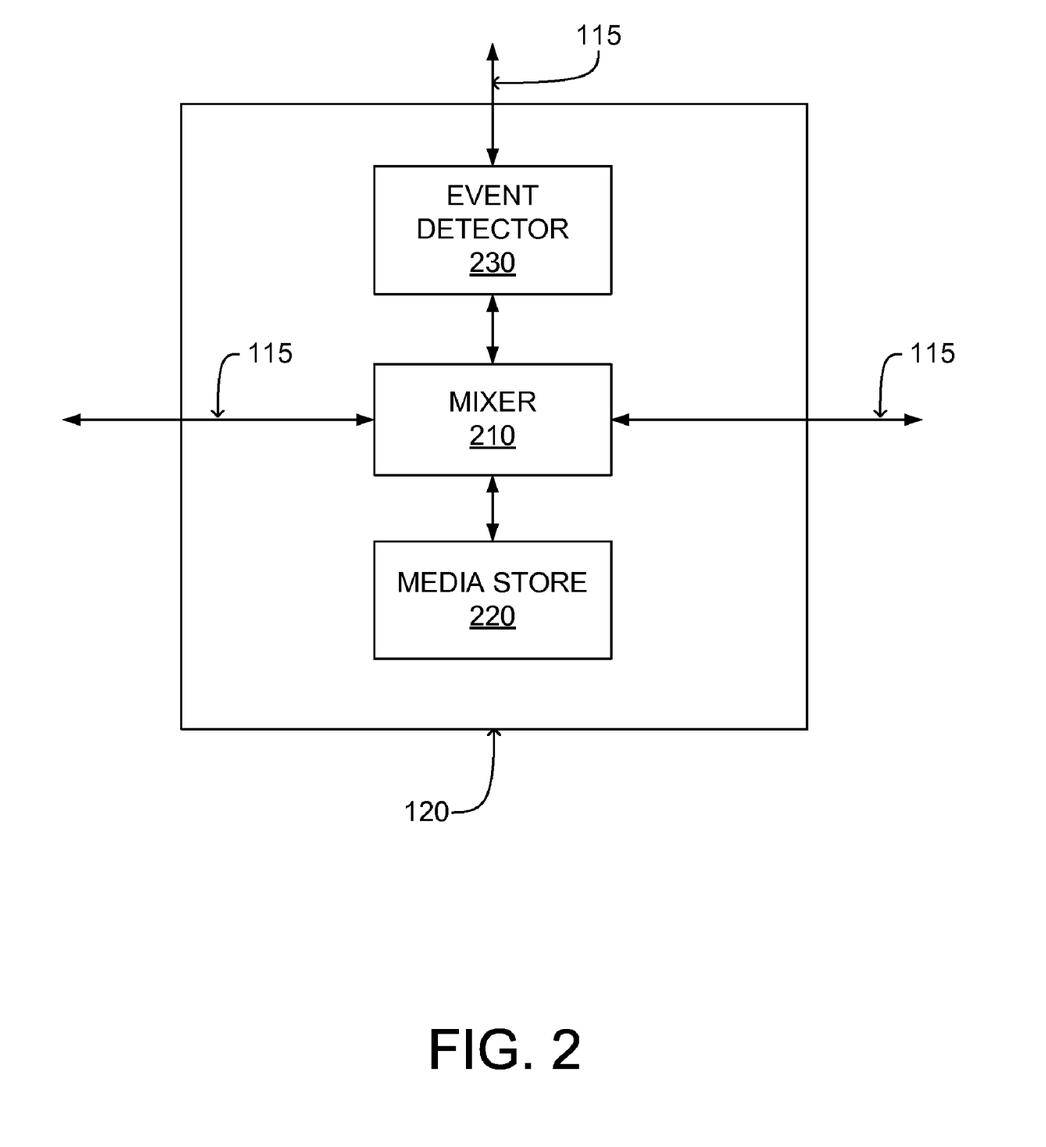
FIG. 2 is a block diagram of a media server for receiving voice data and accessing distributed content according to an embodiment of the present invention.

FIG. 2 is a block diagram of a media server 120 for receiving voice data and accessing distributed content according to an embodiment of the present invention. In one embodiment, the media server 120 comprises a mixer 210, a media store 220 and event detector 230. Those of skill in the art will recognize that different embodiments can provide the functionality of FIG. 2 in different ways. Moreover, other embodiments can include different and/or additional features and/or components than the ones described here.

The mixer 210 receives data, such as voice data, from a client device 110A, 110B and a mixing table or mixing matrix from the application server 130 via the network 115 and applies the mixing table or mixing matrix to communicate the received voice data to one or more destinations. Application of the mixing table allows the mixer 210 to control the exchange of data between devices, allowing the application server 130, media generator 150 or other devices, to access data transmitted between client devices 110A, 110B. Hence, the mixer bridges 210 a source client device 110A with a destination client device 110B to exchange data with each other while allowing additional devices, such as the application server 130, or components of the media server 120, such as the media generator 230 or event detector 220, to access the exchanged data. In an embodiment, the mixing table is modified while data is exchanged, allowing routing of data to different devices without disrupting data transmission. For example, the mixer 210 routes data to additional destination devices specified by the mixing table responsive to a characteristic of the exchanged data. Hence, the mixer 210 allows different devices or components to receive the exchanged data and/or modify the exchanged data by inserting additional data, such as user data or application data, into the exchanged data.

The media store 220 comprises a storage device, such as a persistent storage device, a non-persistent storage device or a combination of a persistent storage device and a non-persistent storage device, including predefined data, such as audio data. Data included in the media store 220 is inserted into data exchanged between client devices 110A, 110B responsive to one or more attributes of the exchanged data. For example, the mixer 210 retrieves a tone or other audio data from the media store 220 and inserts the retrieved done or other audio data into the exchanged data. For example, the media store 220 inserts a tone or other audio data into exchanged data indicating that the exchanged data is being monitored for events, such as keywords. In an embodiment, data from the media store 220 is inserted into exchanged data to replace portions of the exchanged data. For example, the mixer 210 inserts data from the media store 220 into the exchanged data to notify a user of data retrieved from a user data store 140. As another example, data from a third party, such as an additional client device 110, is inserted into exchanged data to via the media store 220, allowing data from the third party to be communicated to one or more of the client devices 110A, 110B exchanging data.

The event detector 230 receives data from the mixer 210 and analyzes the received data to identify one or more events included in the exchanged data and identifying when to route the exchanged data to the application server 130. For example, when voice data is exchanged between client devices 110A, 100B, an event comprises a keyword within the exchanged voice data. The event detector 230 communicates with the application server 130 when a keyword is identified, allowing the application server to modify the mixing table so that subsequently received data is routed to destinations, such as the media generator 150 or the application server 130, in addition to a destination client device 110A, 110B, using the network 115. This allows the event detector 230 to use any relevant attribute of the data stream as an event, such as time-domain samples, a frequency domain pattern or a series of parameters or values associated with the data transmission or encoding to identify data for more detailed analysis. In one embodiment, the event detector 230 identifies a small number of keywords and routes exchanged data to the application server 130 for detailed analysis when certain events are detected. Hence, rather than continuously analyze the exchanged data for a large number of events, the event detector 230 identifies a set of events, such as keywords or stress patterns, which trigger more detailed analysis of subsequently received data, conserving computing resources.

The mixer 210 and event detector 230 may be implemented in many ways, for example they may comprise one or more sets of instructions encoded on a computer-readable medium that cause a processor (not shown), to implement the above-described functionality when the stored instructions are executed. Alternatively, the mixer 210 and event detector 230 are implemented by using a hardware and/or firmware. The software and/or firmware can be configured to operate on a general purpose microprocessor or controller, a field programmable gate array (FPGA), an application specific integrated circuit (ASIC) or a combination thereof.

Figure 3:
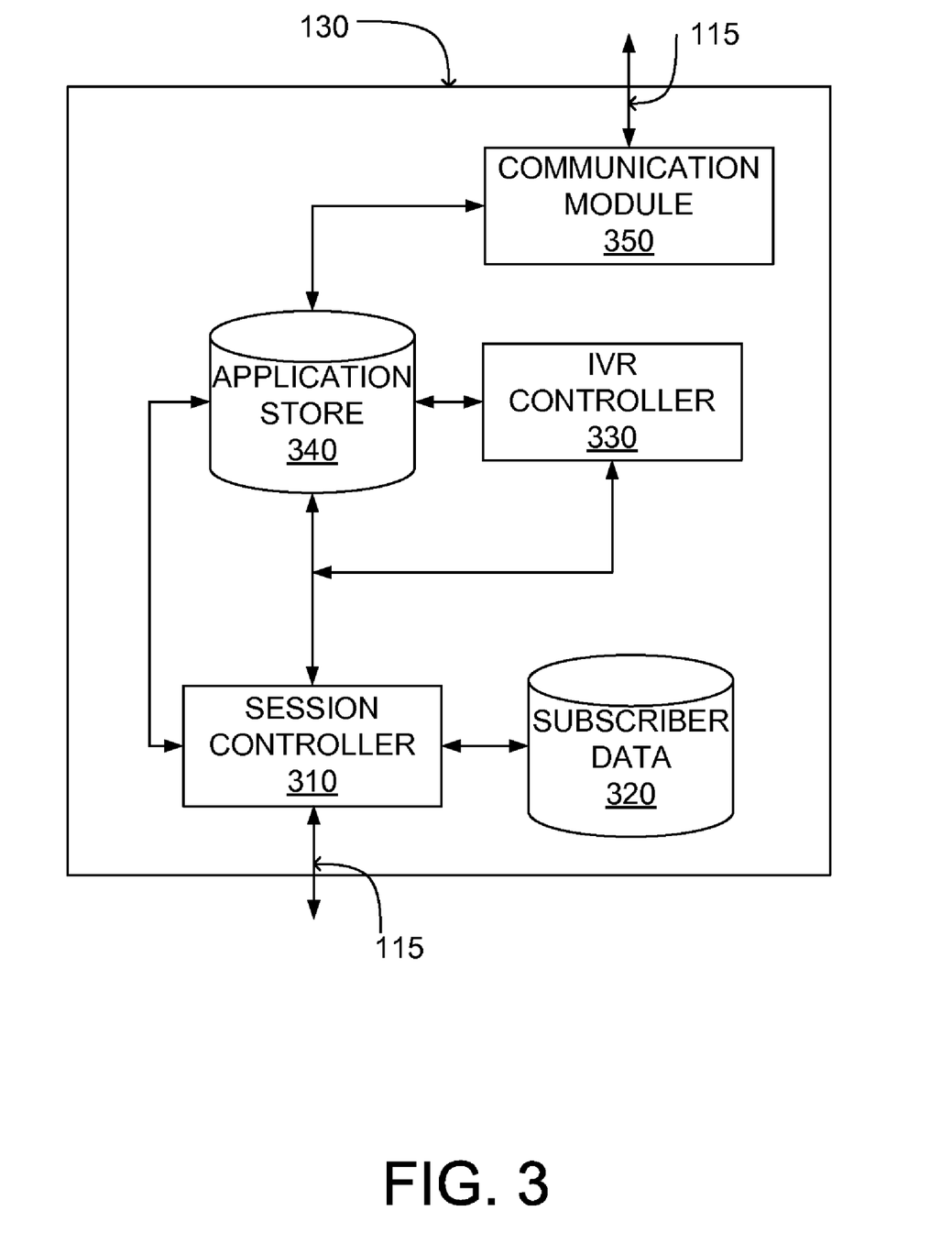
FIG. 3 is a block diagram of an application server for accessing distributed content responsive to voice data according to an embodiment of the present invention.

FIG. 3 is a block diagram of an application server 130 for accessing distributed content responsive to voice data according to an embodiment of the present invention. In one embodiment, the application server 130 comprises a session controller 310 a subscriber data store 320, an interactive voice response (IVR) controller 330, an application data store 340 and a communication module 350. Those of skill in the art will recognize that different embodiments can provide the functionality of FIG. 3 in different ways. Moreover, other embodiments can include different and/or additional features and/or components than the ones described here.

When the media server 120 receives data exchanged between client devices 110A, 110B, session configuration information is transmitted from the media server 120 to the session controller 310 which generates a data exchange session, or "session," from the received data to manage exchange of data between the application server 130 and other devices included in the session, such as a source client device 110A and a destination client device 110B. For example, the session controller 310 extracts device identifiers from the received data, such as phone numbers, identifying a source client device 110A device and a destination client device 110B device exchanging data. The session controller 310 identifies client devices 110A, 110B which are exchanging data to allow insertion of data from the application server 130 into data being exchanged for communication to a client device 110A, 110B.

The extracted device identifiers are used by the session controller 310 to generate a mixing table, or mixing matrix, identifying one or more destination devices, such as a destination client device 110B and/or the media generator 150, to which data received from a source, such as a source client device 110A, is routed or "mixed." For example, if a source client device 110A is transmitting data to a destination client device 110B, the session controller 310 generates a mixing table to communicate data from the source client device 110A to the destination client device 110B. If the destination client device 110B transmits data back to the source client device 110B, the session controller 310 generates a second mixing table describing communication of data from the destination client device 110B to the source client device 110A. The mixing table is communicated to the media server 120, where the mixer 210 routes voice data from a client device 110A, 110B accordingly. In an embodiment, the mixing table is modified while data is exchanged, allowing data to be routed to different destinations without disrupting communication of date between the source client device 110A and the destination client device 110B.

Additionally, by identifying a session, the session controller 310 allows identification of the origin of data communicated to additional components of the application server 130, such as the application data store 340. In one embodiment, the session controller 310 identifies a source device identifier, such as a phone number or other identifier, associated with a source client device 110A and a destination device identifier, such as a phone number or other identifier, associated with a destination client device 110B and generates a session identifier including the source identifier and the destination identifier. The mixing table is generated using the identifiers associated with the source client device 110A and the destination client device 110B. The session controller 310 also maintains a record of active sessions from which the session controller 310 receives data. For example, the session controller 310 stores pairings of source device identifiers and destination device identifiers with exchanged data being routed to the application controller 130.

The session controller 310 is coupled to the subscriber data store 320, which is a storage device including data associating users with one or more device identifiers. In one embodiment, the subscriber data store 320 includes a database associating a user identifier with one or more device identifiers specifying a client device 110A, 110B. The subscriber data store 320 allows association of data received from a client device 110A, 110B to be associated with a user. For example, the subscriber data store 320 associates one or more phone numbers, or other device identifiers, with a user identifier, so that data received from multiple phone numbers is associated with a specific user identifier, allowing a user to access the application server 130 from different client devices 110A.

In an embodiment, the subscriber data store 320 includes additional data associating the user with one or more applications or data sources, allowing the application server 130 to access an application or a remote data source using access information associated with a user. For example, the subscriber data store 320 associates a user identifier with one or more phone numbers and login information for one or more websites or data stores, allowing the application server 130 to retrieve the login information for a website or data store from the subscriber data store 320. In another embodiment, the subscriber data store 320 associates one or more communication protocols with a user identifier, allowing a user to customize how data is received from the application server 130.

Also, the session controller 310 communicates data from the media server 120 to the IVR controller 330. When data is received from a distributed application or data source, the session controller 310 communicates the received data to the media generator 150 for communication to a client device 110A, 110B. The session controller 310 also communicates data to the IVR controller 330 when an event is detected by the event detector 230 to retrieve data form the IVR controller for configuration of the media generator 150. After initialization, the session controller 310 communicates keywords associated with the event and additional configuration information from the IVR controller 330 to the media generator 150 for analysis of data exchanged between the client devices 110A, 110B using natural language speech recognition.

Responsive to receiving data from the media generator 150 identifying a command, the session controller 310 communicates with the application store 340, which is a storage device associating one or more commands with actions or applications. The application store 340 includes one or more sets of instructions encoded on a computer-readable medium which cause a processor (not shown), to implement perform one or more actions when the stored instructions are executed. After a command is identified by the media generator 150, data describing the command is communicated to the application data store 340 via the session controller 310 to access an action or application associated with the identified command. For example, responsive to media generator 150 detecting the command "calendar," the session controller 310 receives data identifying a calendar application which is accessed from the application store 340 to retrieve schedule data associated with the user providing the command.

In one embodiment, the application data store 340 locally stores a set of user data and instructions that when executed by a processor (not shown) cause retrieval or modification of data associated with the user data. The application data store 340 also includes data for accessing one or more external user data stores 140A, 140N, such as Uniform Resource Indicators (URIs) identifying a user data store 140 and transmission of data to an external user data store 140, responsive to receipt of data associated with a command by the session controller 310. Data from the application data store 340 is combined with data from the subscriber data store 320 to access data from the external user data store 140. For example, the application data store 340 associates the command "voice update" with a social networking website URI and instructions for communicating data to the identified social networking website and login information for the social networking website is retrieved from the subscriber data store 320. In this example, the application data store 340 extracts information from the data exchanged between client devices 110A, 110B and communicates the extracted information to the social networking website which presents the extracted information as a status message associated with the user.

The application data store 340 also includes an Application Programming Interface (API) which modifies data received from a user data store 140 into a format for insertion into data exchanged between client devices 110A, 110B. The API allows different user data sources 140A, 140N to communicate data to client devices 110A, 110B using the application server 130, media generator 150 and media server 120. The stored API simplifies interaction between the application server 130 and one or more user data sources 140 by providing a standardized framework for user data stores 140 to format and communicate information.

The communication module 350 is coupled to the network 115 and communicates data from the application server 130 to a user data store 140, the media generator 150 and/or the media server 120. In one embodiment, the communication module 350 is a conventional wired connection, such as USB, IEEE 1394 or Ethernet, to the network 115 for transmission and receipt of data or instructions. In another embodiment, the communication module 350 is a wireless transceiver, such as for infrared communication, IEEE 802.11 a/b/g/n (or WiFi) communication, IEE 802.16 (or WiMax) communication, BLUETOOTH® communication, 3G communication, or radio frequency communication. Alternatively, the communication module 350 comprises a combination of a transceiver and a wired connection.

The session controller 310 and IVR controller 330 described above may be implemented in many ways, for example they may comprise one or more sets of instructions encoded on a computer-readable medium that cause a processor (not shown), to implement the above-described functionality when the stored instructions are executed. Alternatively, the session controller 310 and IVR controller 330 are implemented by using hardware and/or firmware. The software and/or firmware can be configured to operate on a general purpose microprocessor or controller, a field programmable gate array (FPGA), an application specific integrated circuit (ASIC) or a combination thereof.

As described above, the subscriber data store 320 and the application data store 340 comprise one or more storage devices. In one embodiment, the subscriber data store 320 and the application data store 340 comprise partitions of a single storage device. Alternatively, separate storage devices are used to implement the subscriber data store 320 and the application data store 340. In various embodiments, the persistent storage device, or persistent storage devices comprise one or more non-persistent storage devices or one or more combinations of a persistent storage device and a non-persistent storage device.

Figure 4:
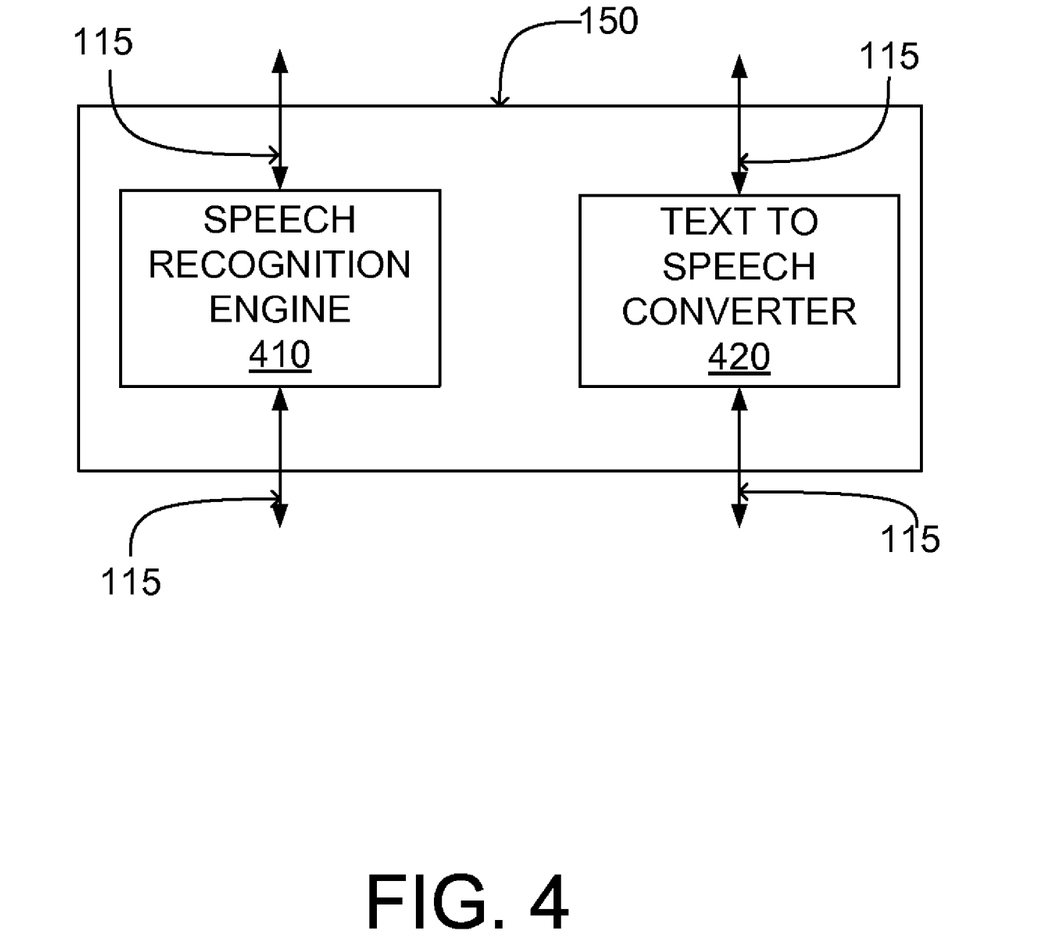
FIG. 4 is a block diagram of a media generator for identifying commands included in voice data according to an embodiment of the present invention.

FIG. 4 is a block diagram of a media generator 150 for identifying commands included in voice data according to an embodiment of the present invention. In one embodiment, the media generator 150 comprises a speech recognition engine 410 and a text to speech converter 420 which are coupled to the network 115. Those of skill in the art will recognize that different embodiments can provide the functionality of FIG. 4 in different ways. Moreover, other embodiments can include different and/or additional features and/or components than the ones described here.

After the event detector 230 notifies the application server 130 that an event has been detected, the application server 130 communicates configuration data to the speech recognition engine 410. The configuration information identifies commands, such as keywords, associated with the detected event and additional data to allow the speech recognition engine 410 to determine when voice data includes one or more of the identified commands. In an embodiment, the speech recognition engine 410 applies one or more natural language processing methods to received voice data to identify a command.

As the media server 120 initially identifies events within the exchanged data, the application initialization request from the media server 120 to the application server 130 specifies how the speech recognition engine 410 is initialized. This allows customization of the commands which the speech recognition engine 410 identifies from the exchanged data. Customizing the commands to be identified by the speech recognition engine 420 based on a detected event simplifies speech recognition engine 410 implementation, allowing more rapid detection of commands. In an embodiment, to further improve command identification, the speech recognition engine 410 applies enhancement methods, such as noise cancellation or echo cancellation, to remove impairments from the received data.

The text to speech converter 420 receives data from the application server 130 via network 115 and generates an audio representation of the received data. The audio representation of the received data is then communicated to the media server for routing to a client device 110A, 110B. Hence, the text to speech converter 420 enables data from the application server to be accessed during a voice call without requiring an application to provide a dedicated interface for voice interaction.

The speech recognition engine 410 and text to speech converter 420 described above may be implemented in many ways, for example they may comprise one or more sets of instructions encoded on a computer-readable medium that cause a processor (not shown), to implement the above-described functionality when the stored instructions are executed. Alternatively, the speech recognition engine 410 and text to speech converter 420 are implemented by using hardware and/or firmware. The software and/or firmware can be configured to operate on a general purpose microprocessor or controller, a field programmable gate array (FPGA), an application specific integrated circuit (ASIC) or a combination thereof.

System Operation

Figure 5:
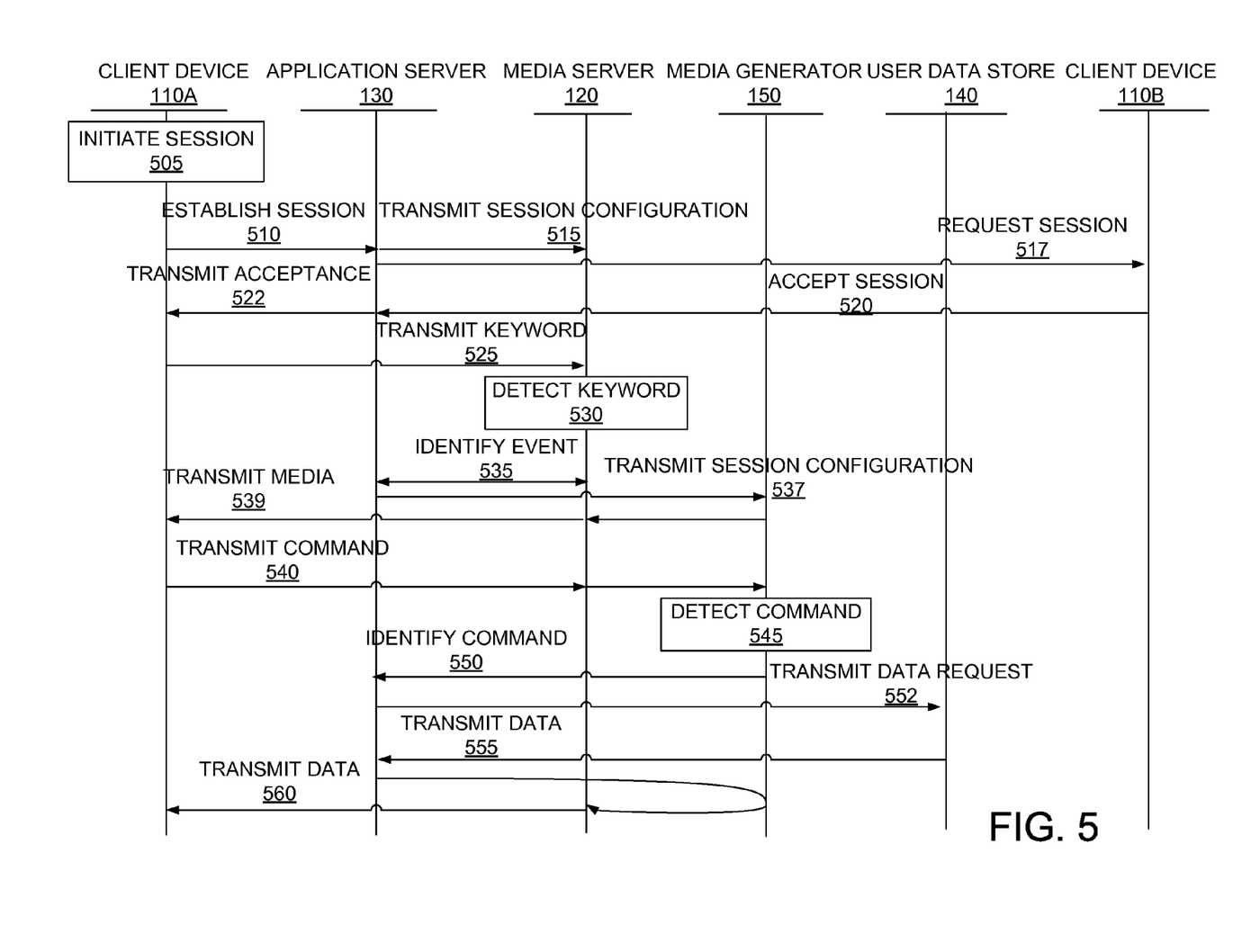
FIG. 5 is an event diagram of a method for retrieving distributed content responsive to received voice data according to an embodiment of the present invention.

FIG. 5 is an event diagram of a method for retrieving distributed content responsive to voice data according to an embodiment of the present invention. For purposes of illustration, FIG. 5 depicts interaction between a source client device 110A, an application server 130, a media server 120, a user data store 140, a media generator 150 and a destination client device 110B. However, in other embodiments, multiple client devices 110A, B, multiple user data stores 140 and/or multiple media generators 150 communicate with the media server 120 and the application server 130.

Initially, the source client device 110A initiates 505 a data exchange to communicate with the destination client device 110B. For purposes of this example embodiment, the data exchange between client devices 110A, 110B is referred to herein as a "session." For example, the client device 110A initiates 505 a telephone call to exchange voice data with the destination client device 110B by generating initialization information responsive to receiving an identifier associated with the destination client device 110B, such as a phone number. Responsive to generating the initialization information for a call to the identifier associated with the destination client device 110B, the source client device 110A establishes 510 a session by transmitting initialization data to the application server 130.

Upon receiving the initialization data, the session controller 310 included in the application server 130 generates session configuration information including an identifier associated with the source client device 110A and an identifier associated with the destination source client device 110B. The session controller 310 generates a record of the communication between the source client device 110A and the destination client device 110B. For example, the session controller 310 stores the identifier associated with the source client device 110A, such as a phone number, and the identifier associated with the destination client device 110B, such as a phone number. The session controller 310 also communicates with the subscriber data store 320 included in the application server 130 to identify one or more user identifiers associated with the identifier associated with the source client device 110A and/or the identifier associated with the destination client device 110B.

In addition to generating session configuration information, the session controller 310 also specifies the events to be identified by the event detector 230 included in the media server 120. The session controller 310 also generates a mixing table, or mixing matrix, identifying one or more destinations for data received from the source client device 110A, such as the destination client device 110B. The generated mixing table describes the flow of voice data between one or more components by identifying devices to which voice data is transmitted.

The application server 130 transmits 515 session configuration information, including the mixing matrix, to the media server 120 to configure the mixer 210 and event detector 230. The mixer 210 uses the mixing table, or mixing matrix, to route data between the source client device 110A and the destination client device 110B. As initial event detection is performed by the event detector 230, the initially-generated mixing matrix routes data between the source client device 110A, the destination client device 110B and the event detector 230 of the media server 120. After the session configuration information is transmitted 515 to the media server 120, the application server 130 requests 417 the session by transmitting session data to the destination client device 110B. For example, the application server 130 transmits an identifier associated with the source client device 110A and a data exchange request to the destination client device 110B.

The destination client device 110B accepts 520 the session by transmitting an acknowledgement message to the application server 130. Upon receiving the acknowledgement, the application server 130 generates a second mixing matrix specifying that data received from the destination client device 110B is transmitted to the source client device 110A. The second mixing table is transmitted to the media server 120 and the session acceptance is transmitted 522 to the source client device 110A via the media server 120 and the network 115. This configures data exchange between the source client device 110A and the destination client device 110B while enabling the event detector 230 to analyze the exchanged data for an event. Additionally, session establishment identifies the client devices 110A, 110B to the application server 130, allowing the session controller 310 to determine users associated with the source client device 110A and/or the destination client device 110B.

Data, such as voice data, is then communicated between the source client device 110A and the destination client device 110B. The communicated data is routed through the media server 120, allowing examination by the event detector 230 for one or more events. For example, the event detector 230 analyzes the communicated data to identify one or more keywords included in voice data. During data communication, the source client device 110A transmits 525 an event, which is detected 530 by the event detector 230. For example, during exchange of voice data in a call, the keyword "service" is included in the voice data and detected 530 by the event detector 230.

Detection of the event causes the media server 120 to identify 535 the event to the application server 130, which specifies an application associated with the detected event. An application request is transmitted from the media server to the application server 130. In an embodiment, the application request includes the detected event and a session identifier associated with the detected event. Additionally, event identification causes the application server 130 to modify the mixing table to route data received from the source client device 110A to the media generator 150 as well as to the destination client device 110B. Routing data from the source client device 110A to the media generator 150 analysis of data transmitted by the source client device 110A for commands.

Responsive to receiving the application initialization request, the application server 130 identifies an application associated with the event and transmits 537 session configuration data to the media generator 150. The transmitted session configuration data configures the media generator 150 to analyze subsequently received data for commands associated with the detected event and identifies commands associated with the application.

In one embodiment, the media generator 150 transmits 539 data to the source client device 110A via the media server 120 when the media generator 150 is configured to identify commands. For example, audio data indicating that an application is initiated or identifying the initiated application is transmitted to the source client device 110A. In an implementation, an initiated application receives and/or transmits data that is private to a user associated with the source client device 110A, so, the media generator 150 transmits 539 predetermined data, such as background music, advertisements or similar data to the destination client device 110B to prevent a user of the destination client device 110B from overhearing this private data. In an embodiment, the media generator 150 transmits a message to the media server 120 specifying data from the media store 220 for transmission 430 to the source client device 110A. Hence, the media generator 150 and/or the media store 220 allows private exchange of data between the source client device 110A and the application server 130 without disconnecting the session between the source client device 110A and the destination client device 110B. Alternatively, data is openly exchanged between the source client device 110A and the destination client device 110B after the application media generator receives session configuration data, allowing the media controller 150 to passively monitor exchanged data for commands.

After initiating the application, the source client device 110A transmits 540 a command associated with the application. Because of the modification to the mixing table after event detection, the transmitted command is routed through the media server 120 to the media generator 150, where the command is detected 545 by the speech recognition engine 410. Responsive to detecting 545 the command, the media generator 150 identifies 550 the detected command to the application server 130. In an embodiment, the media generator 150 transmits a session identifier and a description of the identified command to the application server 130. Receiving the command identification causes the application server 130 to access the application data store 340 to identify an action associated with the command and/or a user data store 140 associated with the command. The application server 130 then executes the action specified by the application data store 340 and generates a request for data that is transmitted 550 to the user data store 140 associated with the command. For example, the media generator 150 detects 545 the keywords "get schedule" and identifies the detected command to the application server 130 where the application data store 340 associates the keywords "get schedule" with a calendar application. A request for the schedule of the user associated with the source client device 110A is generated and transmitted 550 from the application server 130 to a user data store 140. As another example, the media generator 150 detects 545 the keywords "get status of A" and the application server 130 determines from the application data store 340 that the keywords "get status of A" are associated with social networking website. The application server 130 generates a request for the status message of social networking website member "A" and transmits 550 the request to the appropriate user data store 140. In an embodiment, user data is retrieved from the subscriber data store 320 and included in the data request to access user-specific data in a user data store 140.

The generated request for data is transmitted 550 to the user data store 140, which retrieves and transmits 555 the requested data to the application server 130. After receiving the requested data and associating the requested data with a session, the application server 130 transmits 560 the data to the media generator 150, where an audio representation of the data is generated by the text to speech converter 420. The audio representation of the data is transmitted 560 from the media generator 150 to the media server 120 which routes the audio representation of the data to the source client device 110A. For example, the application data store 340 obtains schedule information retrieved from the user data store 140 and transmits 560 the schedule data to the media generator 150 which generates an audio representation of the schedule information that is transmitted 560 to the source client device 110A via the media server 120 and the network 115. As another example, a social networking website member's status information is retrieved from the user data store 140 and transmitted from the application server 130 to the media generator 150 where an audio representation of the status information is generated and transmitted 560 to the source client device 110A via the media server 120 and the network 115.

In one embodiment, the initiated application is stopped after data is transmitted 560 from the application server 130 to the source client device 110A, causing the application server 130 to transmit a modified mixing table to the mixer 210 of the media server 120 so that data subsequently transmitted by the source client device 110A is not routed to the media generator 150. Alternatively, the application remains initiated and data is routed to the application server 130 until a second command is detected by the media generator 150, and the mixing table is modified responsive to the second command.

For purposes of illustration, FIG. 5 describes an example where the application server 130 retrieves data from a user data store 140 responsive to a detected command. However, in another example, the application server 130 transmits data to the user data store 140 responsive to a detected command, allowing a user to modify data using the source client device. When the application server 130 transmits data to the user data store 140, the application store 340 identifies data transmitted by the source client device 110A and transmits the identified data to the user data store 140.

Figure 6:
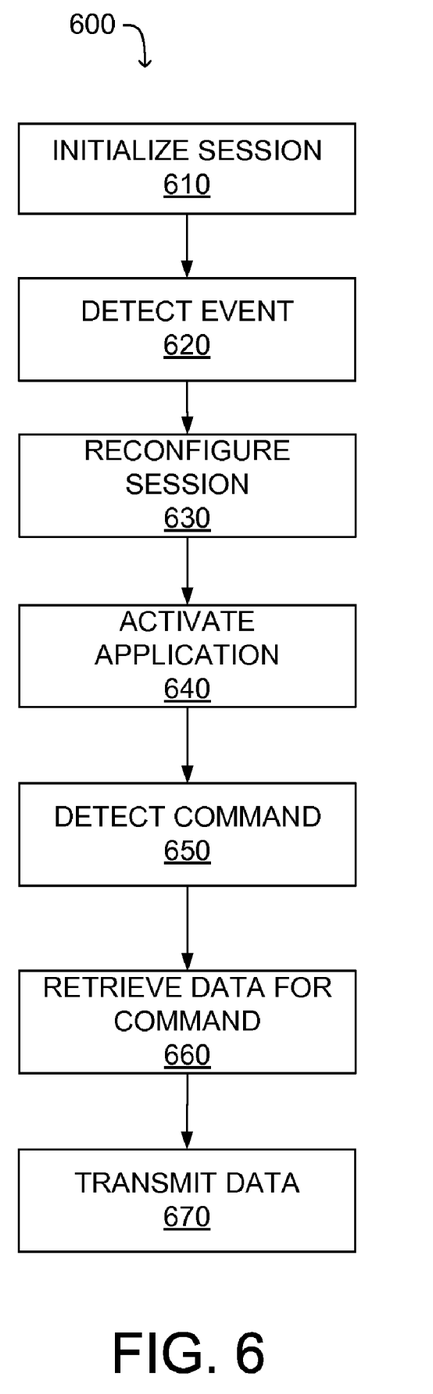
FIG. 6 is a flow chart of a method for retrieving distributed content responsive to received voice data according to an embodiment of the present invention.

FIG. 6 is a flow chart of a method 600 for retrieving distributed content responsive to voice data according to an embodiment of the present invention. In an embodiment, the steps of the method 560 are implemented by a processor included in the media server 120, the media generator 150 and/or the application server 130 executing instructions encoded on a computer-readable storage medium that cause the processor to perform the described actions when executed. Those of skill in the art will recognize that one or more of the methods may be implemented in embodiments of hardware and/or software or combinations thereof. Furthermore, those of skill in the art will recognize that other embodiments can perform the steps of FIG. 6 in different orders. Moreover, other embodiments can include different and/or additional steps than the ones described here.

The application server 130 initializes 610 a session responsive to initialization data received from a source client device 110A by generating a record of the communication between a source client device 110A and a destination client device 110B. In one embodiment, the session configuration information includes an identifier associated with the source client device 110A and an identifier associated with a destination source client device 110B. For example, the session controller 310 stores the identifier associated with the source client device 110A, such as a phone number, and the identifier associated with the destination client device 110B, such as a phone number, to generate a record identifying the session. In addition to generating session configuration information, the session controller 310 also specifies the events to be identified by the event detector 230 included in the media server 120. The session controller 310 also generates a mixing table, or mixing matrix, identifying one or more destinations for data received from the source client device 110A, such as the destination client device 110B. The generated mixing table describes the flow of voice data between one or more components by identifying devices to which voice data is transmitted.

Because initial event detection is performed by the event detector 230, the initially-generated mixing matrix routes data between the source client device 110A, the destination client device 110B and the event detector 230. After generating the mixing matrix, data is communicated from the source client device 110A to the media server 120, which analyzes the data using the event detector 230 and routes the data to the destination client device 110B. The session controller 310 also communicates with the subscriber data store 320 included in the application server 130 to associate one or more user identifiers with the identifier associated with the source client device 110A and/or the identifier associated with the destination client device 110B to associate users with associated with the client devices 110A, 110B exchanging data.

During communication of data from the source client device 110A to the destination client device 110B, the event detector 230 detects 620 an event, such as a keyword, in the communicated data. Responsive to detecting 620 the event, the media server 120 communicates an application request to the application server 130 identifying the session in which the event was detected and a description of the detected event. The application server 130 reconfigures 630 the session so that the media generator 150 receives subsequently transmitted data from the source client device 110A for analysis. To reconfigure the session, the application server 130 modifies the mixing table to identify the media generator 150 as a destination and communicates the modified mixing table to the mixer 210 so data subsequently transmitted by the source client device 110A is routed through the media generator 150 for analysis. The application server 130 also identifies an application associated with the detected event from the application data store 340 and also communicates one or more commands associated with the identified command to the media generator 150 describing the commands to be detected.

In one embodiment, session reconfiguration also communicates data from the media generator 150 to the source client device 110A via the media server 120 indicating detection of an event. For example, audio data identifying the detected event or a tone indicating detection of an event is transmitted to the source client device 110A. In an embodiment, data from the media generator 150 is transmitted to the destination client device 110B, allowing data subsequently transmitted from the source client device 110A to be routed to the media generator 150 without being overheard by the destination client device 110B. Transmitting data from the media generator 150 to the destination client device 110B allows private exchange of data between the source client device 110A and the media generator 150 without disconnecting the session between the source client device 110A and the destination client device 110B. In an embodiment, the media generator 150 transmits a message to the media server 120 specifying data from the media store 220 for transmission 430 to the source client device 110A.

After reconfiguring the session and activating the application, data subsequently transferred by the source client device 110A is routed through the media server 120 to the media generator 150 where a command is detected 650. The media generator 150 transmits data describing the detected command and the session to the application server 130, which accesses the application data store 340 to identify an action and a user data store 140 associated with the command. The application server 130 then executes the identified action and retrieves 660 data associated with the command from the user data store 140.

For example, the media generator 150 detects 650 the keywords "get schedule" and identifies the detected command to the application server 130 where the application data store 340 associates the keywords "get schedule" with a calendar application. A request for the schedule of the user associated with the source client device 110A is retrieved 560 from a user data store 140. As another example, the media generator 150 detects 650 the keywords "get status of A" and the application server 130 determines from the application data store 340 that the keywords "get status of A" are associated with social networking website. The application server 130 retrieves 650 a status message of social networking website member "A" from a user data store 140 such as a social network. In an embodiment, user data is retrieved from the subscriber data store 320 and used when retrieving 560 data from a user data store 140.

The retrieved data is then transmitted 670 from the application server 130 to the source client device 110A by being routed through the media generator 150 and the media server 120 according to the session controller 310 and mixer 210. For example, retrieved schedule information is transmitted to the media generator 120 where the text to speech converter 420 generates an audio representation of the schedule information. The audio representation is transmitted 570 from the media generator 150 to the media server 120, where the mixer routes it to the source client device 110A. As another example, an audio representation of a social networking website member's status information is generated responsive to the media generator 150 receiving status information from the application server 130 and the audio representation is transmitted 670 to the source client device 110A using the media server 120.

Figure 7:
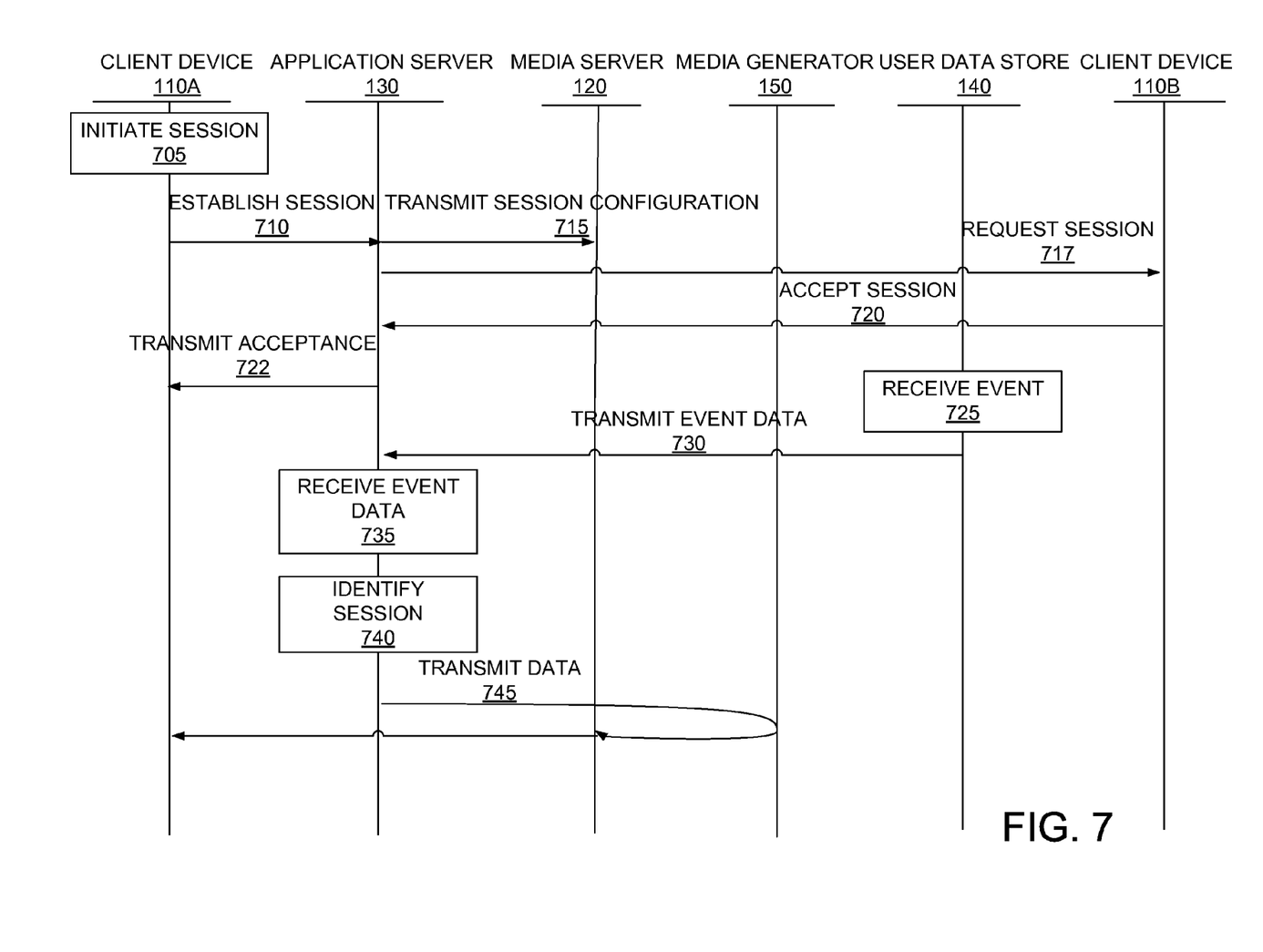
FIG. 7 is an event diagram of a method for inserting data from a user data store into exchanged voice data according to an embodiment of the present invention.

FIG. 7 is an event diagram of a method for inserting data from a user data store into exchanged voice data according to an embodiment of the present invention. For purposes of illustration, FIG. 7 depicts interaction between a source client device 110A, an application server 130, a media server 120, a user data store 140, a media generator 150 and a destination client device 110B. However, in other embodiments, multiple client devices 110A, 110B, multiple user data stores 140 and/or multiple media generators 150 communicate with the media server 120 and the application server 130. As depicted in FIG. 7, data from a user data store is inserted into an established data exchange between the source client device 110A and the destination client device 110B, allowing data to be "pushed" into an exchange of voice data between the client device 110A, 110B.

Initially, the source client device 110A initiates 705 a data exchange to communicate with the destination client device 110B. For purposes of this example embodiment, the data exchange between client devices 110A, 110B is referred to herein as a "session." For example, the client device 110A initiates 705 a telephone call to exchange voice data with the destination client device 110B by generating initialization information responsive to receiving an identifier associated with the destination client device 110B, such as a phone number. Responsive to generating the initialization information for a call to the identifier associated with the destination client device 110B, the source client device 110A establishes 710 a session by transmitting initialization data to the application server 130.

Upon receiving the initialization data, the session controller 310 included in the application server 130 generates session configuration information including an identifier associated with the source client device 110A and an identifier associated with the destination source client device 110B. The session controller 310 generates a record of the communication between the source client device 110A and the destination client device 110B. For example, the session controller 310 stores the identifier associated with the source client device 110A, such as a phone number, and the identifier associated with the destination client device 110B, such as a phone number. The session controller 310 also communicates with the subscriber data store 320 included in the application server 130 to identify one or more a user identifiers associated with the identifier associated with the source client device 110A and/or the identifier associated with the destination client device 110B. For example, the session controller 310 generates a session identifying the source client device 110A, the destination client device 110B and associating the source client device 110A with one or more user identifiers included in the subscriber data store 320, such as one or more authentication credentials associated with one or more user data stores 140. The session controller 310 also generates a mixing table, or mixing matrix, identifying one or more destinations for data received from the source client device 110A, such as the destination client device 110B. The generated mixing table describes the flow of voice data between one or more components by identifying devices to which voice data is transmitted.

The application server 130 transmits 715 session configuration information, including the mixing matrix, to the media server 120 to configure the mixer 210, which uses the mixing table, or mixing matrix, to route data between the source client device 110A and the destination client device 110B. After the session configuration information is transmitted 715 to the media server 120, the application server 130 requests 717 the session by transmitting session data to the destination client device 110B via the media server 120. For example, the application server 130 transmits an identifier associated with the source client device 110A and a data exchange request to the destination client device 110B.

The destination client device 110B accepts 720 the session by transmitting an acknowledgement message to the application server 130. Upon receiving the acknowledgement, the application server 130 generates a second mixing matrix specifying that data received from the destination client device 110B is transmitted to the source client device 110A. The second mixing table is transmitted to the media server 120 and the session acceptance is transmitted 722 to the source client device 110A via the media server 120 and the network 115. This configures data exchange between the source client device 110A and the destination client device 110B. Additionally, session establishment identifies the client devices 110A, 110B to the application server 130, allowing the session controller 310 to determine users associated with the source client device 110A and/or the destination client device 110B by accessing the subscriber data store 320.

Data, such as voice data, is then communicated between the source client device 110A and the destination client device 110B. The communicated data is routed through the media server 120 where the mixer 210 identifies one or more destinations for the exchanged data. As data is exchanged between the source client device 110A and the destination client device 110B, data from a user data store 140 may be inserted into the exchanged data and communicated to at least one of the client devices 110A, 110B. For example, a user stores scheduling data in a user data store 140 which reminds the user of scheduled functions by communicating one or more reminder messages to the client device 110A, 110B associated with the user. Alternatively, a user data store 140 receives electronic information from a third party, such as a website, and communicates the received data to a user associated with a client device 110A, 110B, allowing the third party to contribute to the exchanged data in real time.

To insert data into the session, the user data store 140 receives 725 an event. In one embodiment, the event comprises an interaction with a website or other online application. For example, a user submits a status message to a social networking website. As another example, the user data store 140 determines that a user has a function with a starting time within a predetermined interval from the current time. As yet another example, the user data store 140 receives data, such as an email or text message, including a command or indication that the data is to be communicated to a user of a client device 110A, 110B. Event data comprising the event and a user identifier associated with the event is transmitted 730 from the user data store to the application server 130 via the network 115. For example, the user data store transmits 730 event data, such as a status identifier, reminder or other data and a user identifier associated with the intended recipient of the data to the application server 130.

The application server 130 receives 735 the event data and identifies 740 a session associated with the event data. From the event data the session controller 310 determines whether a session includes the user identifier. For example, the session controller 310 includes an association between an identifier associated with a client device 110A, such as a phone number, and one or more user identifiers included in the subscriber data store 320, such as one or more authentication credentials associated with one or more user data stores 140. Responsive to identifying 740 a session including the user identifier, the identifier associated with a client device 110, such as the source client device 110A, is retrieved from the identified session. While the example shown in FIG. 7 illustrates communication of data from the user data store 140 to the source client device 110A, in another example data is communicated to the destination client device 110B from the user data store 140. Hence, the session controller 310 receives a user identifier from the user data store 140 and determines a client device 110A, 110B associated with the user identifier by comparing the user identifier to records of established sessions between client devices 110A, 110B.

After determining the client device 110A, 110B associated with the event data, the application server 130 transmits 745 data describing the event, or the event, to the client device 110A, 110B associated with the event data from the user data store 140. In the example shown in FIG. 7, the data describing the event, or the event, is transmitted 745 to the source client device 110A. The data describing the event, or the event, is transmitted 745 from the application server 130 to the media generator 150, where an audio representation of the data describing the event, or the event, is generated by the text to speech converter 420. In an embodiment, an audio representation of the data is generated by the user data store 140, and the audio representation of the data is transmitted 730 to the application server and transmitted 745 from the application server to the media server 120 for communication to the source client device 110A. Alternatively, the source client device 110A locally generates the audio representation of the data.

The audio representation of the data is transmitted 745 from the media generator 150 to the media server 120 which routes the audio representation of the data to the source client device 110A. This allows the media server 120 to route the data to the source client device 110A and not the destination client device 110B, enabling data from the user data store 140 to be privately communicated to the source client device 110B. In another embodiment, the media server 120 communicates data from the user data store 140 to both the source client device 110A and the destination client device 110B, allowing dissemination of data to both client devices 110A, 110B in a session.

For example, the application server 130 receives 735 a reminder message that the user associated with the source client device 110A has a function scheduled to begin fifteen minutes from the current time. The application server 130 identifies the source client device 110A from the session controller 310 session records and the reminder message is transmitted 745 to the media generator 150. An audio representation of the reminder message is generated by the media generator 150 and transmitted 745 to the media server 120 where the audio representation of the reminder message is routed to the source client device 110A by the mixer 210. As the media server 120 communicates the audio representation of the reminder message to the source client device 110A, the destination client device 110B does not also receive the audio representation of the reminder message, allowing private communication of the reminder message to the user of the source client device 110A.

As another example, updated status information of a social networking website member is to be communicated to the user of the source client device 110A. The updated status information is transmitted 730 to the application server along with a user identifier associated with the user of the source client device 110A. The application server 130 identifies the source client device 110A from the session controller 310 session records and the updated status information is transmitted 745 to the media generator 150 where an audio representation of the updated status information is generated. The audio representation of the updated status information is transmitted 745 to the media server 120 where it is routed to the source client device 110A by the mixer 210. As the media server 120 communicates the audio representation of the updated status information to the source client device 110A, the destination client device 110B does not also receive the audio representation of the updated status information, allowing communication of the updated status information to one of the client devices 110A, 110B in a session.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for accessing data from a remote source responsive to voice data comprising:

a client device transmitting first voice data, the first voice data including an event;

a media server coupled to the client device, the media server receiving the first voice data from the client device and applying a mixing table to the first received voice data, wherein the mixing table detects the event and identifies one or more destinations for the first voice data transmitted by the client device, the one or more destinations including a second client device;

an application server coupled to the media server, the application server receiving an application request from the media server responsive to the media server detecting the event, initializing an application in response to the application request and modifying the mixing table to identify additional destinations for second voice data transmitted by the client device responsive to the media server detecting the event;

a media generator coupled to the application server and to the media server, the media generator receiving the second voice data from the media server in response to application of the modified mixing table, analyzing the second voice data for a command associated with the application and responsive to detecting the command, communicating a description of the command to the application server; and a user data store coupled to the application server, the user data store receiving a request for data from the application server responsive to the application server receiving the description of the command from the media generator and transmitting data to the application server responsive to the request.

2. The system of claim 1, wherein the media server includes a mixer applying the mixing table to route voice data transmitted by the client device to one or more destinations.

3. The system of claim 2, wherein the one or more destinations comprise the media server and the media generator.

4. The system of claim 1, wherein the media server includes a media store storing predefined audio data.

5. The system of claim 4, wherein the predefined audio data comprises one or more audio tones or audio signals.

6. The system of claim 1, wherein the application server further comprises an interactive voice response (IVR) controller associating commands associated with the event with audio data.

7. The system of claim 1, wherein the application server includes an application data store, the application data store associating one or more actions with the description of the command.

8. The system of claim 1, wherein the application server includes a subscriber data store, the subscriber data store associating a device identified associated with the client device with a user.

9. The system of claim 8, wherein the subscriber data store further associates the user with one or more applications or with the user data store.

10. The system of claim 9, wherein the subscriber data store includes login information for the user data store associated with the user.

11. The system of claim 1, wherein the application server includes a session controller, the session controller generating session configuration information describing the client device, a destination device and the mixing table identifying the destination device as a destination for voice data transmitted by the client device.

12. The system of claim 11, wherein the session controller generates a modified mixing table responsive to the media server detecting the event, the modified mixing table identifying the media generator and the destination device as destinations for voice data transmitted by the client device.

13. The system of claim 1, wherein:
the media generator extracts data from the second voice data received from the media server responsive to detecting a second command and transmits the extracted data to the user data store.

14. The system of claim 1, wherein the media generator includes a speech recognition engine identifying the command in the voice data.

15. The system of claim 1, wherein the media generator includes a text to speech converter generating an audio representation of the data transmitted to the application server from the user data store responsive to the request for data.

16. The system of claim 15, wherein the media generator transmits the audio representation of the data transmitted to the application server from the user data store to the media server for communication to the client device.

17. The system of claim 1, wherein the media server includes an event detector analyzing voice data transmitted by the client device for a characteristic associated with detected events.

18. The system of claim 17, wherein the characteristic associated with the event comprises a keyword, a voice stress pattern, a time-domain sample or a frequency domain pattern.

19. A computer implemented method of accessing data from a remote source responsive to voice data, the method comprising:
receiving first voice data including an event from a first client device;
applying a mixing table to the first received voice data, wherein the mixing table detects the event and identifies one or more destinations for the first voice data, the one or more destinations including a second client device;
transmitting an application request in response to detecting the event, wherein the application request initializes an application and modifies the mixing table to identify additional destinations for second voice data received from the first client device; and
transmitting a portion of the second voice data in response to application of the modified mixing table, wherein the second voice data is analyzed for a command associated with the application and the command causes the application to receive data from a user data store.

20. The method of claim 19, wherein applying the mixing table routes voice data transmitted by the first client device to one or more destinations.

21. The method of claim 19, wherein responsive to the application request, generating session configuration information describing the first client device, a destination device and the mixing table identifying the destination device as a destination for voice data transmitted by the first client device.

22. The method of claim 21, wherein responsive to the detecting of the event, generating a modified mixing table, the modified mixing table identifying a media generator and the destination device as destinations to transmit voice data received from the first client device, the media generator receiving the portion of the second voice data.

23. A non-transitory computer-readable storage medium comprising stored computer program code for accessing data from a remote source response to voice data, the computer program code when executed causes one or more processors to:
receive first voice data including an event from a first client device;
apply a mixing table to the first received voice data, wherein the mixing table detects the event and identifies one or more destinations for the first voice data, the one or more destinations including a second client device;
transmit an application request in response to detecting the event, wherein the application request initializes an application and modifies the mixing table to identify additional destinations for second voice data received from the first client device; and
transmit a portion of the second voice data in response to application of the modified mixing table, wherein the second voice data is analyzed for a command associated with the application and the command causes the application to receive data from a user data store.

24. The computer-readable storage medium of claim 23, wherein the program code to apply the mixing table further comprises program code to route voice data received from the first client device to one or more destinations.

25. The computer-readable storage medium of claim 23, wherein the computer program code further comprises instructions to generate session configuration information describing the first client device, a destination device and the mixing table identifying the destination device as a destination for voice data transmitted by the first client device.

26. The computer-readable storage medium of claim 25, the computer program code comprising further instructions to generate a modified mixing table in response to the detecting of the event, the modified mixing table identifying a media generator and the destination device as destinations for voice data transmitted by the first client device, the media generator receiving the portion of the second voice data.

* * * * *